Nov. 23, 1948.  C. D. PETERSON ET AL  2,454,614
CONTROL SYSTEM FOR TRANSMISSION MECHANISMS
Filed Oct. 25, 1945
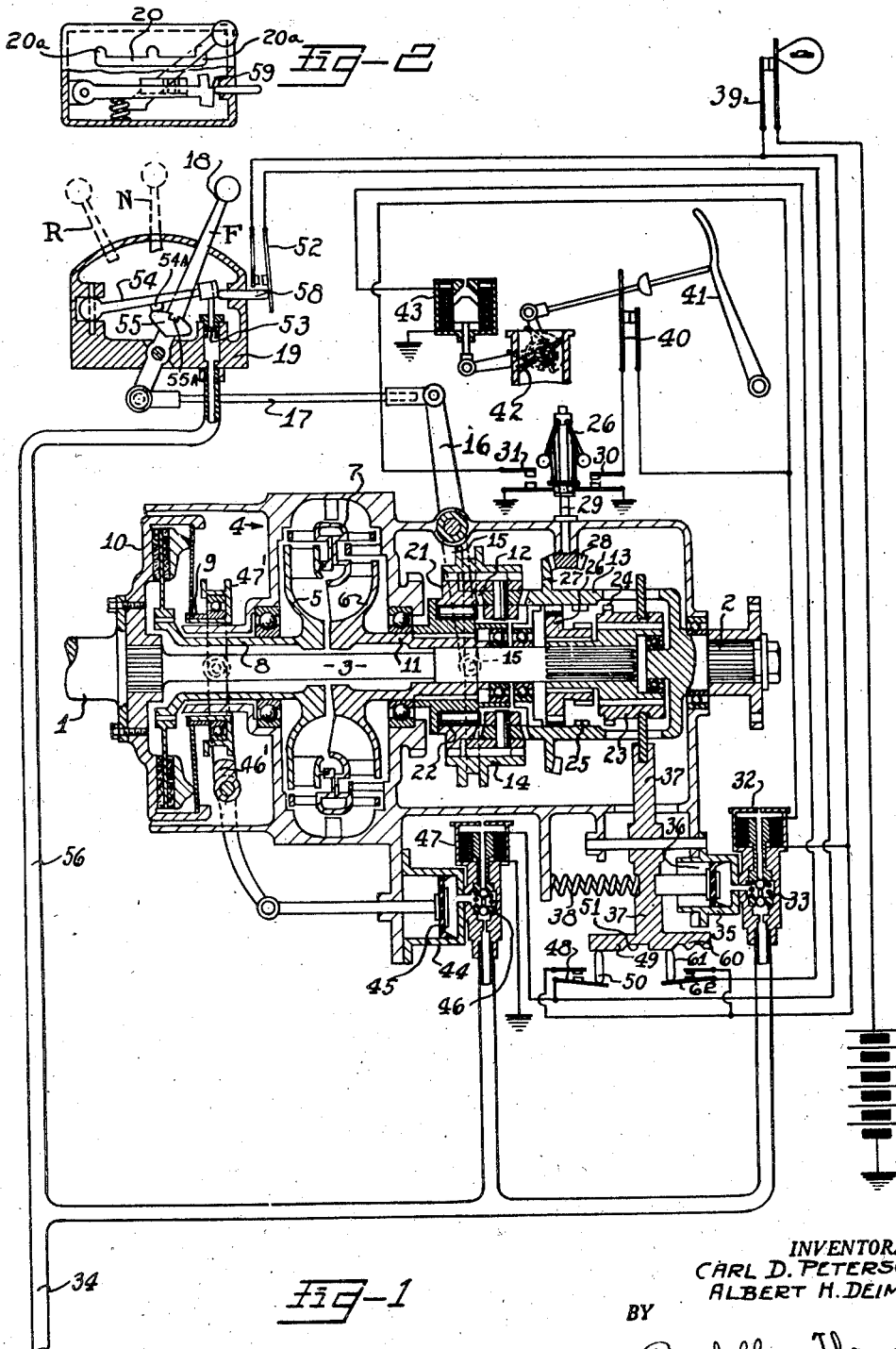
INVENTORS
CARL D. PETERSON
ALBERT H. DEIMEL
BY
Bodell & Thompson
ATTORNEYS Patented Nov. 23, 1948

2,454,614

UNITED STATES PATENT OFFICE 2,454,614

CONTROL SYSTEM FOR TRANSMISSION MECHANISMS

Carl D. Peterson and Albert H. Deimel, Toledo, Ohio, assignors to Dana Corporation, Toledo, Ohio, a corporation of Virginia Application October 25, 1945, Serial No. 624,525

9 Claims. (Cl. 192—.01)

This invention relates to power transmission mechanisms for automotive vehicles in which the power of the engine is transferred to the driven or load shaft through two speed ratios, one, in the present embodiment of the invention, being a direct drive, high speed range, and the other, an indirect drive and low speed range through a hydraulic torque converter, each drive including shiftable transmission members, as for example, clutches which are alternately engageable, and one of which is engaged when the drive is through the indirect low speed ratios, and the other, when the drive is through the direct drive high speed ratios.

In the illustrated embodiment of the invention, the indirect drive is through a hydraulic torque converter.

In transmissions using hydraulic torque converters, the efficient range covers a certain vehicle speed range over which the torque converter produces torque multiplication, the multiplication gradually dropping until the input and output torque of the converter becomes equal. If the vehicle speed is still further increased beyond this point, the output torque rapidly drops below the input torque, and hence the drive becomes inefficient with high increase in heat in the hydraulic fluid and poor fuel economy. For this reason, drives through hydraulic torque converters include a mechanical direct drive clutch, which is engaged for high speed and the drive through to the converter discontinued and the converter allowed to rest until the vehicle speed again drops to a point where the drive requires more torque multiplication, and hence the drive again taken up through the indirect drive, that is, the hydraulic torque converter. If this shift to the converter drive and to the direct drive is left to the judgment of the driver, poor economy may result as frequently the driver may neglect to shift into direct drive at the correct vehicle speed.

The invention has for its object an automatic control system including a speed-operated governor, which controls the shifting-in of the high speed clutch, in this embodiment of the invention, the direct drive clutch, at a plurality of different successive high speeds, and in which the shifting-in of the direct drive clutch at the lower of the high speeds direct drives is controlled also by the position of the throttle of the engine, and the governor control for that lower direct drive overruled, when the throttle reaches or passes beyond a predetermined open position, so that the driver is not required to exercise judgment when to shift the direct drive clutch, for the most efficient operation, but the shift is automatically controlled in all but the maximum direct drive speed partly by the engine throttle operating means when operated normally to get more power and open the throttle wider from a predetermined partly open position.

In the illustrated embodiment of the invention, the direct clutch is shifted in at two speeds— a lower high speed and maximum high speed.

If, for instance, the vehicle, and hence the governor reaches the lower direct drive high speed position, say the 20 M. P. H. position, and the throttle is opened beyond that predetermined position, the shifting-in of the high speed clutch will be overruled and the shift will not take place. It will take place if and when the speed of the vehicle and the governor is at the predetermined speed and the throttle is short of a predetermined partly-open position. The shift will take place, if the speed holds when the throttle is opened beyond the predetermined point and the operator lets up on the throttle pedal and the throttle returns to predetermined open position without reducing the speed. The shift will take place when the vehicle reaches the highest speed range, say for example, 30 M. P. H. by acceleration through converter drive and will hold as long as the vehicle is running in the highest speed range, regardless of the throttle position. The maximum or highest speed range can not be overruled directly except by the governor.

In the system of this invention, the shift to direct drive occurs automatically, dependent upon vehicle and governor speed, and in lower direct drive speed, on the throttle position, when the input and output torque of the converter is approximately equal. Thus, because of controlling the automatic shifting-in of the high speed or direct drive by a governor operated at a plurality of points in the high speed range, and the overruling of the governor control in all the speeds in the high speed range, except the maximum speed, by the shifting of the throttle relative to predetermined intermediate throttle position, highest efficiency, minimum heating of hydraulic fluid, and fuel economy is obtained.

The invention consists in the novel features and in the combinations and constructions hereinafter set forth and claimed.

In describing this invention, reference is had to the accompanying drawings in which like characters designate corresponding parts in all the views.

Figure 1 is a diagrammatic view of this system applied to one form of transmission mechanism.

Figure 2 is a diagrammatic view showing the forward and reverse shift lever and mechanism in plan.

This system is shown as applied to a transmission mechanism of the general type shown in Peterson and Deimel Patent No. 2,369,369 issued February 13, 1945, in which the high speed drive is direct drive and the lower and intermediate speeds and also reverse through a hydraulic torque converter, although the high speed drive may, in so far as this invention is concerned, be an overdrive instead of a direct drive. For convenience the maximum speed is considered throughout the specification as a direct drive and not an over-drive.

The invention consists in a governor operated by the output or driven shaft of the transmission and operating to successively close control members, one member being operated at a certain low direct drive speed, say at a speed of twenty miles per hour (20 M. P. H.), if the throttle is at or short of a predetermined position to throw in or engage the high speed clutch and cut out the converter clutch, and the other operable at highest vehicle speed, as for instance, thirty miles per hour (30 M. P. H.) to throw in the high speed clutch and throw out the converter clutch, the control member, which operates at the lower of the direct drive speeds, being disabled by the opening of the throttle of the engine a predetermined amount to accelerate the vehicle to a speed between the twenty and thirty miles per hour ranges; so that in building up the speed between these two direct drive ranges, the direct drive clutch is disengaged and the converter clutch engaged, and when the thirty miles per hour range is reached, the direct drive clutch again engages. If the throttle is opened beyond the predetermined open position, when the vehicle, and hence the governor, reaches the lower direct drive range, the drive will be continued through the converter without interruption, until the highest direct drive speed range is reached. If the speed drops below the high speed direct drive range (30 M. P. H.) and the throttle is open beyond a predetermined position, the shift down to indirect drive or converter range will occur.

In the illustrated embodiment of the invention, the high speed drive is a direct drive and the low and intermediate speeds indirect drive.

1 designates the drive shaft, which is actuated by an internal combustion engine; 2, the driven shaft; and 3, an axial extension of the drive shaft. 4 designates a hydraulic torque converter, 5, the pump or impeller thereof; 6, the turbine; and 7, the stator. The construction of the torque converter per se forms no part of the invention. It may be of any well known construction. The pump or impeller 5 has an elongated hub or sleeve 8 concentric with the shaft 3, this being connectable to a drive shaft 1 through a normally-engaged, self-engaging shiftable clutch member 9 coacting with the driving clutch member 10 on the shaft 1. This shiftable clutch member may be of any suitable construction, that here shown being of the Bellville type. The turbine 6 is formed with an axially extending hub 11 which, through suitable forward and reverse gearing designated generally 12, coacts with a hollow cylindrical head 13 forming part of the driven shaft 2. 14 designates a forward and reverse clutch collar operable by a fork 15 on a lever 16, which is connected by a link 17 to a hand lever 18 suitably mounted in a box 19 so located that the hand lever is within reach of the driver. The lever 18 has a fore-and-aft shifting movement and a lateral movement, when in neutral and in forward and reverse position, these movements being indicated by the guide slot 20 and notches 20a (Figure 2). The lever is shown as in its forward speed position. It is normally in forward speed position during ordinary running. The lateral movement of the lever will be described incidentally in connection with the control system.

The reverse gearing 12 may be of any suitable construction. It is here shown as of the planetary type wherein when in forward gear the reverse gearing rotates as a unit, and when in reverse gear, the carrier of the planetary pinions is held stationary, so that the planetary pinions are held from orbital movement and free to rotate about their own axes, and when in neutral position, this carrier is unclutched from a driving member 21 rotatable with the output sleeve 11 of the converter through an overrunning roller clutch 22, which permits the planetary gearing to overrun the converter, when the transmission is in direct drive and the converter is cut out by reason of the clutch 9 being disengaged. The reverse gearing, however, may be of the type shown in the patent referred to.

23 designates the shiftable high speed or direct drive clutch member or collar, this being normally disengaged. It is splined on the direct drive shaft extension 3 and is shiftable to move its clutch jaws or teeth 24 into engagement with internal complemental clutch teeth 25 on the inner face of the hollow head 13. This clutch is a balking clutch, and 26' designates the balking ring. However, this clutch construction per se forms no part of this invention, and any means for facilitating the clutch engagements by synchronizing or crossing of the speeds of the two parts to be clutched together may be employed.

The control system includes a governor operated by the driven shaft and the control members are, in the illustrated embodiment of the invention, successively closable, self-opening switches operated to closed position at different speeds of the output shaft, the switch closed at the lower speed being also openable or disabled by the opening of the throttle of the engine by the depression of the accelerator pedal beyond a certain amount. The switch controlling the highest speed is controlled solely by the governor. It is assumed, for the purpose of this description, that these switches are closed by the vehicle speeds of twenty and thirty miles per hour. These switches are connected in different branches of an energizing circuit, and this circuit has an electro-responsive device, as a solenoid, controlling the flow of power to a power-operated means for shifting in the clutch member 23 against the action of the throw-out means, as a spring. The branch connected to the switch, which closes at the lower speed, as the twenty miles per hour speed, having a normally closed switch therein, which is opened by the operation of the accelerator pedal to open the throttle beyond the predetermined amount.

26 designates the governor which may be of any well known construction, this being actuated from the output shaft through suitable mechanism, as a ring gear 27 on the head 13, meshing with the pinion 28 on the shaft 29 of the governor 26, which operates the shiftable centrifugal weights. 30 and 31 designate the normally-open, successively-closable switches, the switch 30 closing at a lower speed, as twenty miles per hour, than the switch 31, which closes at, for instance, thirty miles per hour. 32 designates an electro-responsive device, as a solenoid, which, when energized, opens a valve 33 of the combined intake and exhaust type, to permit air to flow from a supply line 34 to a cylinder 35, which actuates a piston 36 therein, which in turn operates a sliding fork 37 coacting with the clutch member or collar 23, the piston being single acting, and acting against a spring 38 which acts on the fork 37 to throw out the clutch collar 23 when the solenoid 32 is deenergized and hence the cylinder 35 open to the exhaust of air. The feed circuit for the solenoid 32 is through a suitable manually closable switch, as an ignition switch 39, and through branches leading to the switches 30, 31, the branch leading to the switch 30, which closes at the lower speed, being through a normally closed switch 40, which is opened when the driver depresses the accelerator pedal 41 to open the throttle 42 of the engine beyond a predetermined amount, so that if the switch 30 is closed, when the throttle is depressed this predetermined amount, the circuit therethrough will be opened and the solenoid 32 de-energized.

A solenoid 43 is connected in a circuit controlled by the shifting in and out of the high speed clutch collar 23 for the purpose of closing the throttle and decelerating the engine during the shifting operations. This feature itself forms no part of the inventive feature of this system.

In operation, the speed of the vehicle is built up from start through low and intermediate speeds, through the torque converter drive until the speed reaches a predetermined low direct drive range, as for instance, twenty miles per hour, at which time the governor switch 30 will be closed by the governor and the solenoid 32 energized, permitting air to flow into the shift cylinder 35 to shift in the clutch collar 23, if the throttle is short of a predetermined closed position, so that now the drive is a direct one from the drive shaft and through its extension 3, clutch 23 to the head 13 of the driven shaft 2. If the throttle is beyond the predetermined closed position, the governor switch 30 is overruled or cut out by the switch 40 having been opened by the operation of the accelerator pedal 41. Hence, the drive continues through the converter until the highest direct drive speed range is reached and the governor switch 31 closed, so that the direct drive high speed clutch collar 23 engages and the converter clutch 9 disengages. The direct drive persists as long as speed maintains the switch 31 closed.

The self-engageable converter clutch 9 is thrown out by power means including a cylinder 44 having a piston 45 therein, the rod of which is connected to a fork 46' working in the groove of a collar 47' of the converter clutch 9. The flow of power, as air, to and from the cylinder 44 is controlled by a normally-closed combined intake and exhaust valve 46 operated by an electro-responsive device or solenoid 47 which is connected in a circuit through the ignition switch 39 and a normally open switch 48, which is closed when the high speed clutch collar or member 23 is shifted to engaged position, so that when the solenoid 47 is energized, the converter clutch 9 is disengaged. The switch 48 is here shown as operated by a cam 49 operating a poppet or push pin 50 to hold the switch 48 open. When, however, the fork 37 is shifted to the left, this pin drops into a notch 51 when the clutch collar 23 is fully engaged, permitting the switch 48 to close and it remains closed as long as the clutch collar is in engaged position. The solenoid 47 is also connected into an energizing circuit controlled by a switch 52 which is operated by the forward and reverse shift lever 18. This switch 52 is closed only when the shift lever is in neutral position. The switch 52 may also be closed when the shift lever 18 is in reverse position. A lock is provided for locking the shift lever 18 in neutral position, this lock being unlocked by air pressure from the feed pipe 34. The locking device consists of a piston 53 which, when the pressure is sufficient, elevates a latch lever 54 out of locking engagement with a notch in a segmental plate 55 on the lever 18. The latch 54 or lug 54a thereon drops into the notch in the latch plate 55 on the lever 18, when the lever 18 is in neutral and there is not sufficient air pressure in the air line 34 through the pipe 56 to the piston chamber for the piston 53, to elevate the latch 54 out of locking position, so that the engine must be idled long enough to cause the air pump to build up sufficient pressure to supply the shift cylinders 35, 44 to shift the clutch collars 23, 47' respectively. In addition to moving up and down, the latch lever has a lateral movement effected by the lateral movement of the shift lever 18. The lateral movement into the lengthwise fore-and-aft shaft portion of the slot 20 from the notches 20a shifts the lever, so that a pin or poppet 58 operated thereby drops into a notch 59 in the head at the end of the latch lever 54 and permits the switch 52 to close, thus energizing the solenoid 47 and causing the air to enter the shift cylinder 44 to disengage the converter clutch 9, while the fore-and-aft shift is being made along the slot 20. When the shift is completed and the lever moved laterally into one of the notches 20a of the slot 20, the pin 58, when the latch lever is so moving, is cammed up out of the notch 59 to again open the switch 52. This feature as to the control of the converter clutch 9 by the lever 18 forms no part of this invention.

The throttle is automatically closed and opened to decelerate the engine during the shifting in and out of the high speed clutch collar 23, by cam means designated generally 60 on the fork 37 and coacting through a poppet or pin 61 to close and open a normally open switch 62 in the circuit for the solenoid 43 which controls the automatic opening and closing of the throttle 42 for the shifting of the clutch collar 23. This feature per se forms no part of the invention.

By this system, the shift to direct drive normally takes place automatically at a predetermined low vehicle speed, for example 20 M. P. H., but the shift may be delayed to occur at a higher vehicle speed, as 30 M. P. H. by holding the throttle fully open, or the vehicle may be driven at the 20 M. P. H. speed in direct drive, and when more power is needed and the throttle opened beyond the predetermined position, the governor will be operated and the drive returned to indirect or converter drive. When the need for more power is passed and the throttle released or closed, the drive returns to direct drive, when the vehicle speed drops to minus 20 M. P. H. Where the highway permits the vehicle speed may be increased to high speed through the converter drive when the high speed or direct drive clutch will automatically engage. The governor control can not be overruled by the throttle when in maximum direct drive speed.

The system of this invention results in maximum economy and efficiency and avoids overheating of the hydraulic fluid, as the shifting is entirely out of the driver's control.

What we claim is:

1. A control system for transmission mechanisms which include an engine actuated drive shaft, a driven shaft, a low speed direct drive and a high speed direct drive and also low and high speed in indirect drive between the drive and driven shafts, the low and high speed indirect drives including a hydraulic torque converter, a normally-disengaged, self-disengaging shiftable direct drive clutch member operable to connect the direct drive to the driven shaft, and power means for shifting and holding in the direct drive clutch member, the system including an engine throttle and operating mechanism therefor, a governor operated by the driven shaft, successively operable control members normally in inoperative position and operable to active position by the governor, means controlled by the control members for controlling the operation of the power means to engage the direct drive clutch at different speeds, and means operated by the throttle operating mechanism for rendering inoperative the control member first closed by the governor when the throttle has been opened a predetermined amount.

2. A control system for transmission mechanisms which include an engine actuated drive shaft, a low speed direct drive and a high speed direct drive between the drive and driven shafts, and also low and high speed indirect drive between the shafts, the low indirect drives including a hydraulic torque converter having an impeller and a turbine, a shiftable, normally-engaged, self-engaging converter clutch member between the drive shaft and the impeller, transmitting means between the turbine and the driven shaft, a normally-disengaged, self-disengageable shiftable direct drive clutch member operable to connect the drive shaft to the driven shaft, power means for throwing out and holding out the converter clutch member, and power means for shifting and holding in the direct drive clutch member, the system including an engine throttle and operating mechanism therefor, a governor operated by the driven shaft, successively operable control members operated to active position by the governor at different speeds of the driven shaft, means controlled by the control members for controlling the operation of the power means for the direct drive clutch, means operated by the throttle operating mechanism, when operated to open the throttle a predetermined amount, to operate the first operated control member under the speed of the driven shaft, to inoperative position, thereby releasing the direct drive clutch, and means operated by the shifting in mechanism of the direct drive clutch for controlling the operation of the power means for the converter clutch to throw out the converter clutch when the direct drive clutch is engaged.

3. A control system for transmission mechanisms including an engine actuated drive shaft, a low speed direct drive and high speed direct drive between the drive and driven shafts, and also low and high speed indirect drives between the shafts, the low indirect drives including a hydraulic torque converter, a normally-disengaged, self-disengaging shiftable direct drive clutch member operable to connect the drive shaft to the driven shaft, and power means for shifting in and holding in the direct drive clutch member, the system including a governor operated by the driven shaft, normally-open, successively-closable self-opening switches operated by the governor to different closed positions at different speeds of the driven shaft, an electric circuit having an electro-responsive device therein for controlling the flow of power to the power means for the direct drive clutch and branches connected to said switches respectively, means operated by the throttle mechanism for opening the switch controlling the low speed through direct drive when the throttle is opened a predetermined amount from closed position.

4. A control system for transmission mechanisms including an engine actuated drive shaft, a driven shaft, a low speed direct drive and a high speed direct drive between the drive and driven shafts, and also low and high speed indirect drive between the shafts, the low indirect drive including a hydraulic torque converter having an impeller and a turbine, a shiftable, normally-engaged, self-engaging converter clutch member between the drive shaft and the impeller, transmitting means between the turbine and the driven shaft, a normally-disengaged, self-disengaging shiftable direct drive clutch member operable to connect the drive shaft to the driven shaft, power means for throwing out and holding out the converter clutch member, and power shifting means for shifting and holding in the direct drive clutch member, the system including a governor operated by the driven shaft, normally-open, successively-closable, self-opening switches operated to closed position at different speeds of the driven shaft, an electric circuit having an electro-responsive device therein controlling the flow of power to the power means for the direct drive clutch, and branches connected to the switches respectively, the throttle mechanism being connected to the switch controlling the low direct drive to open said switch when the throttle mechanism is operated to move the throttle a predetermined amount from closed position, an electro-responsive device for controlling the power means for the converter clutch, a circuit therefor, and a normally-open switch therein arranged to be closed by the shifting mechanism for the direct drive clutch when operated to shift in the direct drive clutch.

5. In a control system for transmission mechanisms which include a drive shaft actuated by a throttle-controlled engine, a driven shaft means for transmitting the power from the drive to the driven shafts through two paths including alternately engageable clutches, one for each path, one of said means including a hydraulic torque converter; the combination of means for operating the engine throttle, a governor operated by the driven shaft, successively-operable control members operated thereby for controlling the shifting of the clutches at different speeds, the member controlling the higher speed being governed solely by the operation of the governor and the other control member being governed jointly by the governor and by the throttle mechanism when the latter is operated to open the throttle beyond a predetermined intermediate position, whereby upon the opening of the throttle beyond the predetermined intermediate position, the control of said other control member by the governor is overruled.

6. In a control system for transmission mechanisms which include a drive shaft actuated by a throttle-controlled engine, a driven shaft, two transmitting means between the drive and the driven shafts, alternately engageable clutches, one clutch for each transmitting means for each path, one means including a hydraulic torque converter; the combination of means for operating the engine throttle, a governor operated by the driven shaft, control members operated thereby at different speeds for controlling the shifting of the clutches, the member for controlling the shifting-in of one of the clutches at the highest speed being governed solely by the operation of the governor and the control member controlling the shifting-in of said one of the clutches at the lower speed being governed jointly by the governor and by the engine throttle operating means when operated to open the throttle beyond the predetermined intermediate open position.

7. In a control system for transmission mechanisms which include a drive shaft actuated by a throttle-controlled engine, a driven shaft, two transmitting means between the drive and the driven shafts, alternately engageable clutches, one clutch for each transmitting means for each path, one means including a hydraulic torque converter; the combination of means for operating the engine throttle, a governor operated by the driven shaft, control members operated thereby at different speeds for controlling the shifting of the clutches, the member for controlling the shifting-in of one of the clutches at the highest speed being governed solely by the operation of the governor and the control member controlling the shifting-in of said one of the clutches at the lower speed being governed jointly by the governor and by the engine throttle operating means when operated to open the throttle beyond the predetermined intermediate open position, said control members being normally-open, self-closable switches, circuits therefor, the switches being operable to closed position by the governor at different speeds, and means operated to open the circuit for the switch which controls the shifting-in at the lower speed, when the throttle is opened beyond a predetermined intermediate open position.

8. In a control system for transmission mechanisms which include a drive shaft actuated by a throttle-controlled engine, a driven shaft, motion transmitting means through two different paths between the drive and the driven shafts, the means through one path including a hydraulic torque converter, the motion transmitting means through said paths including alternately engageable clutches, one for each path, one being engaged while the other is disengaged; the combination of means for operating the engine throttle, a governor operated by the driven shaft, successively operable control members operated thereby for controlling the shifting of the clutches at different high speeds to engage and disengage the clutches, and means operated by the throttle operating means for cutting out the control by the governor of the control member first operated when the throttle reaches a predetermined open position and hence releasing the engaged clutch and engaging the disengaged clutch.

9. In a control system for transmission mechanisms which include an engine actuated drive shaft, a driven shaft, direct and indirect drives between the drive and driven shafts, a normally disengaged, self-disengaging shiftable direct drive clutch member, and power means for shifting and holding the shiftable clutch member engaged, the system including an engine throttle and operating mechanism therefor, a governor operated by the driven shaft, successively operable control members normally in inoperative position and operable by the governor to active position at different speeds when in indirect drive, means controlled by the control members for effecting the operation of the power means for the direct drive clutch, and means operated by the throttle operating mechanism for overruling the control member first operated by the governor, when the throttle is operated beyond the predetermined open position.

CARL D. PETERSON.
ALBERT H. DEIMEL.

REFERENCES CITED

The following references are of record in the file of this patent:

UNITED STATES PATENTS

| Number | Name | Date |
|---|---|---|
| 2,252,009 | Kenny | Aug. 12, 1941 |
| 2,266,598 | Hale | Dec. 16, 1941 |
| 2,291,690 | Caves | Aug. 4, 1942 |
| 2,322,479 | Schjolin | June 22, 1943 |
| 2,366,253 | Griswold | Jan. 2, 1945 |